United States Patent Office 3,229,544
Patented Jan. 18, 1966

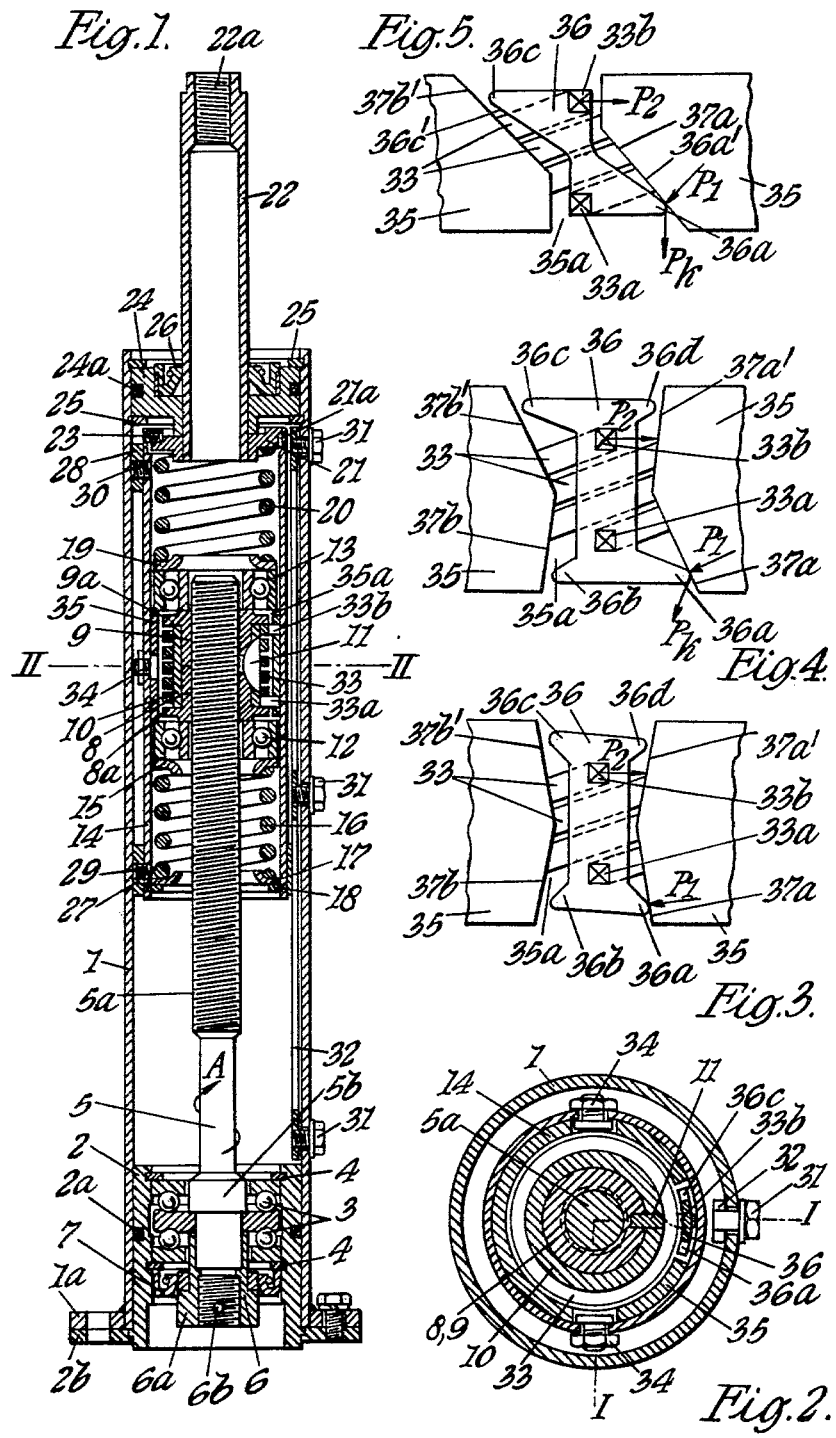

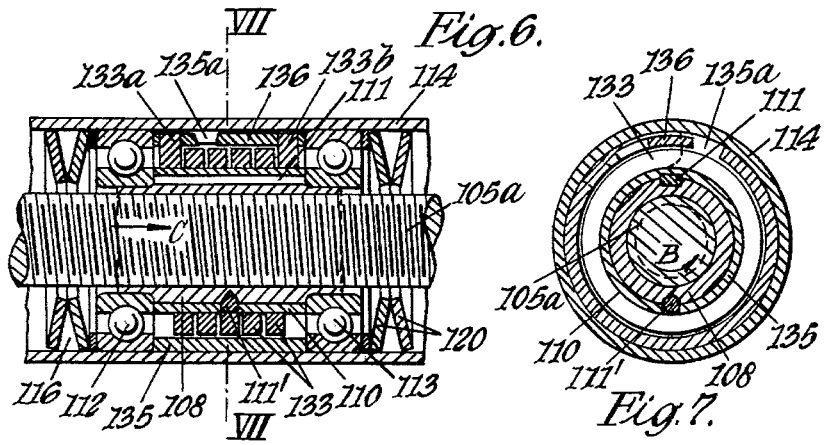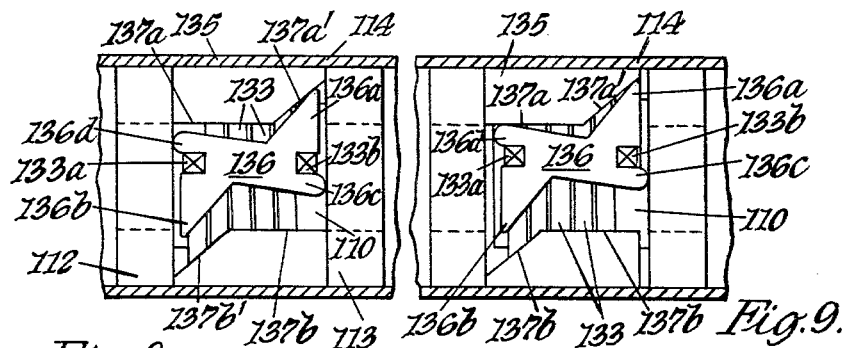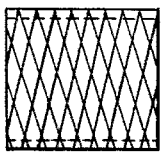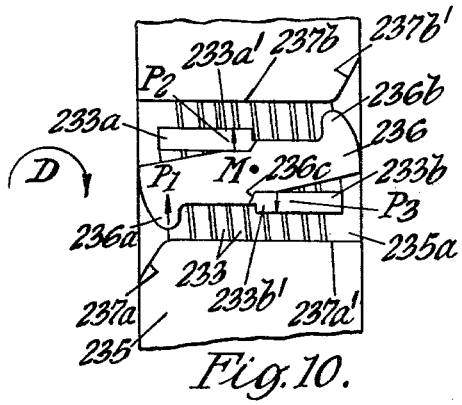

3,229,544
TRANSMISSION MECHANISM PROVIDED WITH A RELEASE DEVICE, FOR CONVERTING A ROTARY MOVEMENT OF A DRIVING MEANS INTO AN AXIAL DISPLACEMENT OF A DRIVEN MEMBER
Richard Haller, 51 Brauerstrasse, Zurich, Switzerland
Filed July 8, 1963, Ser. No. 293,487
Claims priority, application Switzerland, July 7, 1962, 8,239/62
12 Claims. (Cl. 74—424.8)

Transmission mechanisms provided with releasing means, for converting a rotary movement of a driving means into an axial displacement of a driven member, are known and have already been used for various purposes. In a known transmission mechanism of this kind, by means of a cylindrical clamping spring a nut adapted to be screwed along a threaded spindle driven by the driving means is mechanically connected to a tubular member which surrounds this nut coaxially and is not rotatable but is axially displaceable and is connected to the member that is to be driven. During the transmission of power the clamping spring bears against and grips the nut or the aforesaid tubular member and ends of the spring which are bent away radially engage in a longitudinal slot in the other part and one end of the spring transmits a torque and bears against an edge of this slot. The nut is held, between two compression springs, in a central position in the tubular member and when the tubular member is blocked, that is to say prevented from moving and the threaded spindle rotates, then the nut is axially displaced in this tubular member until the force-transmitting end of the clamping spring emerges from the aforesaid longitudinal slot or enters a widened part of the slot, whereby the clamping spring is freed from stress so that the mechanical connection between the nut and the tubular member surrounding the nut is released. In a transmission mechanism of this kind it has been previously proposed to arrange on the threaded spindle two externally symmetrical nuts which are in contact with one another and are secured against rotation relatively to one another and are adapted to be screwed along the spindle, each nut having a flange at its end facing away from the other nut and the cylindrical clamping spring being held between the flanges so as to be incapable of axial displacement.

The invention relates to a transmission mechanism of this kind, provided with a release device, for converting a rotary movement of a driving means into an axial displacement of a driven member, in which by means of a cylindrical clamping spring a nut adapted to be screwed along a threaded spindle driven by the driving means is mechanically connected to a tubular member which surrounds this nut coaxially and is not rotatable but is axially displaceable, and during the transmission of power the clamping spring bears against and grips the nut and ends of the spring which are bent away radially engage in a longitudinal slot in the other part, and the nut is held, between two compression springs, in a central position in the member and when the tubular member is blocked the nut is axially displaced in this member until the force-transmitting end of the clamping spring emerges from the aforesaid longitudinal slot and is released, whereby the clamping spring is freed from stress so that the mechanical connection becomes inoperative and idling occurs, characterised in that the reaction force which the member provided with the longitudinal slot exerts, during the rotation of the nut, on that end of the clamping spring which contacts and bears against one of the longitudinal edges bounding the longitudinal slot, is transmitted by mechanical means to the other, noncontacting end of the clamping spring and acts in the opposite direction, the whole being such that the transmission of the reaction force acting on the end of the clamping spring bearing against the longitudinal edge of the longitudinal slot, to the other end of the clamping spring, causes the stress in the clamping spring to be increased and thus strengthens the transmission of power by the mechanism.

The provision of the mechanical means by which the reaction force acting on the end of the clamping spring bearing against the longitudinal edge bounding the longitudinal slot, is transmitted to the other end of the clamping spring, produces the result that when the threaded spindle is rotated the mechanical connection, which the spring creates between the nut and the tubular member, takes effect more rapidly and is considerably stronger, so that the mechanism changes over from the idling position to the power-transmitting position more quickly and can transmit larger forces. The same effect in the opposite sense is produced during transition from the power-transmitting or working position of the mechanism to the idling position.

Embodiments of the invention and parts of these embodiments are illustrated, diagrammatically in some cases, in the accompanying drawings, in which:

FIGURE 1 shows an axial section on line I—I of FIG. 2 through a mechanism, provided with a release device, for converting a rotary movement of a driving means into an axial displacement of a driven member.

FIGURE 2 shows a section on line II—II of FIGURE 1, on a larger scale,

FIGURE 3 shows a view of a sleeve with a longitudinal slot, and a clamping spring, of the mechanism illustrated in FIGURES 1 and 2, on a larger scale, FIGURE 4 shows a first alternative form of the longitudinally slotted sleeve and clamping spring of the mechanism illustrated in FIGURES 1 and 2, FIGURE 5 shows a view of a second alternative form of the longitudinally slotted sleeve and clamping spring of the mechanism illustrated in FIGURES 1 and 2, FIGURE 6 shows an axial section through part of another embodiment of the mechanism, provided with a release device, for converting a rotary movement of a driving means into an axial displacement of a driven member, FIGURE 7 shows a section on line VII—VII of FIGURE 6, FIGURE 8 shows a view of the longitudinally slotted sleeve of the mechanism illustrated in FIGURES 6 and 7 and of a link which is arranged in this sleeve and in which the ends of a clamping spring are held, at the commencement of transmission of power, FIGURE 9 is a view of the parts shown in FIGURE 8, the mechanism being in the released position, FIGURE 10 is a view of the longitudinally slotted sleeve and of the link arranged in this sleeve in a third embodiment of the mechanism, provided with a release device, for converting a rotary movement of a driving means into an axial movement of a driven member, and FIGURE 11 is a side view of another form of the sleeve on which the clamping spring is arranged.

FIGURES 1 to 4 illustrate a mechanism, provided with a release device, for converting a rotary movement of a driving means into an axial displacement of a driven member, in which the input end of a tubular casing 1 is provided with a fixed flange 1a. A bush 2 is inserted into and rigid with the input end of the casing 1; the bush is provided with a sealing ring 2a, and a flange 2b is provided on the end of the bush projecting from the casing 1. Flanges 1a and 2b are adapted to be attached by means of screws to a flange of a motor casing not shown in the drawings. A two-race thrust ball bearing 3 is inserted into the bush 2 and is held against axial displacement by two expanding rings 4 inserted into grooves in the bush 2. A threaded spindle 5 mounted in the thrust ball bearing 3 has a threaded portion 5a inside the casing, and is provided with a collar 5b; the central ring of the thrust ball bearing 3 is in contact with the side of this collar facing towards the motor casing. The input end of the threaded spindle is provided with a screw-thread on to which a bush 6 is screwed; this bush is secured by a lock pin 6b and has a hexagonal head 6a at the end adjacent to the motor casing. One end of a hexagonal tube not shown in the drawing is slid onto the hexagonal head 6a and the other end is slid on to a hexagonal head on a motor shaft not shown in the drawing, whereby the bush 6 and consequently the threaded spindle 5 is coupled to the motor shaft. A shaft seal 7 is inserted between the bush 6 and the bush 2. Two nuts 8 and 9 symmetrical in respect to their external shape are screwed onto the threaded portion 5a of the threaded spindle 5; the ends of the nuts facing towards one another are in contact with one another, and both nuts have threads of the same hand corresponding to that of the threaded portion 5a. At their ends facing away from one another the nuts 8 and 9 each have a flange 8a and 9a respectively. A bush 10 mounted on the nuts 8 and 9 is between these flanges 8a and 9a. A Woodruff key 11 is inserted into a corresponding keyway made up of two parts of which the first is cut in the bush 10 and the second consists of two halves cut in the nuts 8 and 9 respectively; this key prevents the bush 10 from rotating on the nuts 8 and 9 and also prevents these nuts 8 and 9 from rotating relatively to one another. Two ball bearings 12 and 13 are slidably arranged in a tube 14, and the inner ring of each of these bearings is in contact with a respective one of the ends of the nuts 8 and 9 facing away from one another. A spring plate 15 is in contact with the side of the outer ring of the ball bearing 12 facing away from the nut 8; one end of a compression spring 16 acts on this plate, and the other end of this spring bears against a spring plate 17 held by an expanding ring 18 inserted into a groove at the input end of the tube 14. Likewise, a spring plate 19 is in contact with the side of the outer ring of the ball bearing 13 facing away from the nut 9; one end of a compression spring 20 acts on this plate, and the other end of the spring bears against a flange 21; one end of a coupling rod 22 projects into the casing 1, and the flange 21 is rigidly mounted on that end; the other end of the rod is provided with a threaded mouth 22a for attachment to linkage or the like which is to be actuated and which is not shown in the drawings. The flange 21 is provided with a screw-thread and is screwed into an internal screw-thread in the output end of the tube 14 and secured by a lock pin 23. In order to ensure that the flange 21 and the coupling rod 22 are accurately coaxial with the threaded spindle 5 and the driving shaft and to obtain a firm and satisfactory connection, the flange 21 has on the output side a frusto-conical edge 21a tapering towards the tube 14, and the tube 14 has a corresponding cooperating frusto-conical surface. The coupling rod 22 is guided in a bush 24 provided with a sealing ring 24a; this bush is held, at the output end of the casing 1, between two expanding rings 25 inserted into grooves in the casing 1. A shaft seal 26 bearing against the coupling rod 22 is inserted into a recess on the outside of the bush 24. In order to prevent rotation of the tube 14 in the casing 1, rings 27 and 28 are each attached to a respective end of this tube 14 by means of pins 29 and 30 respectively, and these rings 27 and 28 are each provided with a groove, and a guiding rail 32 passing through the grooves in the two rings 27 and 28 and extending over the whole of the useful length of the casing 1 is arranged in the interspace between the tube 14 and the casing 1 and is secured to the inside of the casing 1 by means of screws 31. The rings 27 and 28 at the same time form guiding shoes by which the tube 14 is guided in the casing 1. A cylindrical clamping spring 33 bears against the bush 10; this spring is preferably a rectangular spring as shown in the drawings. Between the outer rings of the ball bearings 12 and 13 a sleeve 35 is secured to the inside of the tube 14 by means of screws 34. This sleeve 35 is provided with a slot 35a extending over the whole length of the sleeve. The ends 33a and 33b of the clamping spring 33 are bent away radially outwards and engage in the longitudinal slot 35a in the sleeve 35. These ends, however, are not free in this slot but are held in a link 36 in the form of a plate which is freely inserted into the longitudinal slot 35a in the sleeve 35 and can move in this slot. The ends of this link 36 extend beyond the ends 33a and 33b of the clamping spring, and the link is provided with projections 36a and 36b at one of these ends and with projections 36c and 36d at the other. The edges of the longitudinal slot 35a of the sleeve 35 are not rectilinear but are each formed by two equally and oppositely inclined edge surfaces 37a and 37a' in one case and 37b and 37b' in the other, in such a manner that the longitudinal slot 35a widens towards each end.

FIGURE 1 shows the transmission mechanism in one of its limit positions. If the driving means is now set in motion, the threaded spindle 5, 5a rotates in the direction shown by the arrow A in FIGURE 1. Friction causes the nuts 8 and 9 and the bush 10 keyed to these nuts to participate in the rotary movement of the threaded portion 5a, but this participation continues only until the projection 36a on the link 36 bears against the edge surface 37a of the longitudinal slot 35a of the sleeve 35. But the driving action of the friction between the rotating threaded portion 5a and the nuts 8 and 9 continues, and therefore a reaction force $P_1$ arises which acts on the projection 36a on the link 36 and causes the end 33a of the clamping spring 33 to be forced back whereby the clamping spring 33 is wound more tightly so that the clamping action of the clamping spring 33 on the bush 10 is increased. The reaction force $P_1$ acts on the link 36 outwardly of the end of the clamping spring 33 and therefore this force not only forces the end 33a of the clamping spring 33 back but also causes the link 36 to tilt about this end of the clamping spring 33. The link 36 therefore exerts on the other end 33b of the clamping spring 33 a force $P_2$ which acts in the direction opposite to that of the reaction force $P_1$ and by which the tightening of the clamping spring 33 is further strengthened. This tightening of the clamping spring 33 increases the stress in this spring to such an extent that further rotation of the bush 10 and of the nuts 8 and 9 is prevented.

Consequently, the nuts 8 and 9 are screwed further along the threaded portion 5a of the threaded spindle 5 and, in the case illustrated in FIGURE 1, are displaced towards the bush 2, and drive the tube 14 with all parts secured in and on this tube, including the coupling rod 22 and the linkage or the like connected to this rod. When the member actuated by the linkage or the like then reaches its other limit position, or when an obstacle presents itself which prevents any further movement of this member in this direction, then the coupling rod 22 cannot be dispaced any further. But the driving motor even if switched off quickly cannot come to a standstill at once, but must be able to stop gradually and therefore continue to rotate at first. The result of this is that whereas the tube 14 remains stationary in the casing 1, the nuts 8 and 9 are displaced in the tube 14 and compress the compression spring 16. The ends 33a and 33b of the clamping spring 33 which are held in the link 36 are then displaced in the sleeve 35 which is stationary in the tube 14, until finally the projection 36a of the link 36 reaches the end of the sleeve 35 and slides off the edge surface 37a of the longitudinal slot 35a of the sleeve 35.

The link 36 is thus released and is returned to its original position by the clamping spring 33 which unwinds, that is to say, relaxes. The stress in the clamping spring 33 is still further reduced because the projection 36d on the link 36 now bears against the edge surface 37a' of the longitudinal slot 35a in the sleeve 35 and thereby unwinds the end 33b of the clamping spring 33. The link 36 is then tilted in the opposite direction about this end 33b of the clamping spring and thus further unwinds the end 33a of this spring. The clamping action of the clamping spring 33 on the bush 10 is thus eliminated, and the nuts 8 and 9 are rotated by the threaded spindle 5, 5a which continues to rotate, and this permits the driving motor, which has been previously switched off, to stop gradually of its own accord without being braked. If the mechanism is then driven in the opposite direction, the manner of operation is basically the same but in reverse; the projection 36c first bears against the inclined edge surface 37b' of the longitudinal slot 35a of the sleeve 35 and thereby causes the stress in the clamping spring 33 to increase.

In the alternative form illustrated in FIGURE 4 the only difference from the previously described construction of the mechanism is that the diagonally opposite projections 36a and 36c on the link 36 in which the ends 33a and 33b of the clamping spring 33 are held, are substantially longer than the other projections 36b and 36d of this link and that those edge surfaces 37a and 37b' of the longitudinal slot 35a in the sleeve 35 which cooperate with the longer projections 36a and 36c follow a substantially steeper course than the edge surfaces 37a' and 37b. Because of the steepness of the edge surfaces 37a and 37b' of the longitudinal slot 35a in the sleeve 35, that component $P_k$ of the force $P_1$ acting on the projection 36a or 36c of the link 36 which causes the link 36 to tilt, is substantially greater than in the construction illustrated in FIGURE 3. The clamping spring 33 is therefore tightened, i.e. stressed, more rapidly and the clamping force of this clamping spring 33 is made considerably stronger.

In the alternative form illustrated in FIGURE 5, the link 26 has only two diagonally opposite projections 36a and 36c; on the side facing towards the longitudinal centre of the link 36 these projections are each bounded by a steeply inclined edge 36a' and 36c' respectively. The ends 33a and 33b of the clamping spring 33 are inserted into recesses in the other corners of the link 36. Those parts 37a and 37b' of the edge surfaces of the sleeve 35 bounding the slot 35a which are opposite the projections 36a and 36c follow a very steep course, whereas the other parts 37a' and 37b of these surfaces extend approximately parallel to the axis of the threaded spindle 5, 5a. In this case the ends 33a and 33b of the clamping spring are respectively opposite the projections 36a and 36c of the link which cooperate respectively with the parts 37a and 37b' of the edge surfaces of the sleeve 35, and therefore the magnitude of the force component $P_k$ causing the link 36 to tilt is determined only by the steepness of the parts 37a and 37b' of the edge surfaces of the sleeve 35, and since these parts 37a and 37b' of these edge surfaces follow a very steep course the force component $P_k$ is consequently relatively large. As a result, the clamping spring 33 is tightened, i.e. stressed, still more rapidly and strongly.

The tubular casing 1 is tightly sealed at both ends and therefore may contain an oil bath.

If the nuts 8 and 9 consist of a hardenable material, for instance steel, then the bush 10 is not needed and the clamping spring 33 can bear directly on these nuts 8 and 9. If the nuts 8 and 9 consist of a material such as bronze that is not hardenable, then the nuts may be provided with a hard chromium coating, whereby it is also possible to dispense with the bush 10. In each of these two cases the key 11 only performs the function of aligning the two nuts 8 and 9 and preventing them from rotating relatively to one another.

It is also possible to use a construction which is mechanically the reverse of that described above, and in which the clamping spring bears against the inside of the tube 14 or of a bush inserted into and rigid with this tube, and is secured against displacement in this tube 14 by two rings inserted into and rigid with the tube; in this construction the ends of the spring are bent away radially inwards and engage in a longitudinal slot in the two nuts 8 and 9, which in this case do not have the flanges 8a and 9a, or a slot in a bush mounted on and rigid with these nuts 8 and 9. The manner of operation of the mechanism is then the same as described above, with the sole difference that in this case the braking action is produced by outward expansion of the spring.

FIGURES 6 to 9 illustrate only those parts of a transmission mechanism, provided with a release device, for converting a rotary movement of a driving means into an axial displacement of the driven member, which differ from the corresponding parts of the embodiment described above. The foregoing description is referred to in connection with those parts of the second embodiment that are not shown. In order to facilitate comparison with the previously described embodiment, the reference numerals used in FIGURES 6 to 9 correspond to those of the mechanism illustrated in FIGURES 1 to 3 but are greater by 100.

114 is a tube axially displaceably but nonrotatable guided in a tubular casing not shown in the drawings. A sleeve 135 is secured in this tube 114 by means of screws not shown in the drawings and has a longitudinal slot 135a which extends along the whole length of the sleeve; one edge 137a of this slot runs parallel to the axis at the input end and merges at the output end into an edge surface 137a' inclined to the direction of the axis, whereas the other edge 137b of the slot runs parallel to the axis at the output end and merges at the input end into an edge surface 137b' inclined to the direction of the axis, in such a manner that the longitudinal slot 135a widens towards one side at the input end and towards the other side at the output end. The outer ring of ball bearings 112 is slidably guided in the tube 114 and is pressed against the input end of the sleeve 135 by a set of several cup spring pairs 116, of which however only one is shown in FIGURE 6, and in the same way the outer ring of a ball bearing 113 is slidably guided in the tube 114 and is pressed against the output end of this sleeve 135 by a set of several cup spring pairs 120. The inner rings of the ball bearings 112 and 113 are slidably guided on guiding extensions of a nut 108. The nut 108 is screwed on to the threaded portion 105a of a threaded spindle which is coupled coaxially with the shaft of a driving motor in the manner described with reference to FIGURE 1. The nut 108 is not provided with a flange, and a bush 110 is arranged on the nut; by means of a sunk key 111 this bush is secured against sliding and rotation on the nut; a ball 111' is inserted into a hole provided in the bush and engages in a hole in the nut 108; by means of this ball the bush is held against axial displacement on the nut; the bush therefore must rotate and slide together with the nut. A cylindrical clamping spring 133 bears with initial stress against the bush 110; this spring is preferably a rectangular spring as shown. The ends 133a and 133b of this clamping spring 133 are bent away radially outwards and are held in notches at the ends of a link 136 in the form of a plate which is freely inserted into the longitudinal slot 135a in the sleeve 135 and can move in this slot. This link 136 has on each of its longitudinal edges a respective laterally extending projection 136a and 136b; these projections are respectively opposite the inclined side surfaces 137a' and 137b' of the sleeve 135 and cooperate with these edges in the way described hereinafter. The link 136 also has on each of its end edges a respective outwardly extending projection 136c and 136d; in the rest position these projections are in contact with the outer rings of the ball bearings 113 and 112 respectively, as shown in FIGURE 8.

FIGURES 6 and 8 show the mechanism in the rest position, that is to say the position assumed when the threaded spindle 105a is not being driven. The nut 108 is then held in a central position between the inner rings of the ball bearings 112 and 113 and the projections 136c and 136d bear against the outer rings of the ball bearings 113 and 112 as mentioned previously. If the mechanism is now driven, so that the threaded spindle 105a rotates in the direction shown by the arrow B in FIGURE 7, friction at first causes the nut 108 to participate in the rotation and to drive the bush 110 connected to the nut and also the clamping spring 133 bearing under initial stress against the nut, and also the link 136. But after a small rotary movement the projection 136a of the link 136 impinges against the inclined edge surface 137a' and is held back by this surface, as shown in FIGURE 8. A force directed at right angles to the edge surface 137a' of the sleeve 135 is thereby exerted on the projection 136a of the link 136. One component of this force acts in an axial direction and is transmitted, through the projection 136c of the link 136, to the outer ring of the ball bearing 113 and is absorbed by this ring, whereas another component of this force acts in the direction of rotation and causes the link 136 to tilt about the point of contact of its projection 136c with the outer ring of the ball bearing 113; this tilting causes the end 133b of the clamping spring, which end is held in the link 136, to be tightened more strongly so that the initial stress in the clamping spring is strengthened. This tightening of the clamping spring 133 increases the clamping force of this spring to such an extent as to prevent further rotation of the bush 110 and therefore of the nut 108. The result of this is that as the threaded spindle 105a continues to rotate, the nut 108 is screwed along the spindle in the direction of the arrow C shown in FIGURE 6, and thus displaces the tube 114 together with all parts secured in and on the tube, also including the coupling rod connecting the tube 114 to the member to be displaced. When a limit position is reached or an obstacle intervenes so that further displacement of the aforesaid member and therefore of the tube 114 is prevented, then the nut 108 continues to be screwed along the threaded spindle 105a which continues to rotate, and the nut slides in the tube 114 and displaces the ball bearing 113 and consequently compresses the cup springs 120, as shown in FIGURE 9, in essentially the same way as in the first embodiment of the mechanism that was described. The clamping spring 133 and also the link 136 participate in this displacement of the nut 108 in the tube 114. The projection 136a on the link 136 slides down the inclined edge surface 137a' of the sleeve 135 fixed in the tube 114. After the nut 108 has been displaced through a short distance in the tube 114, the other end of the link 136 comes into contact with the edge surface 137a of the sleeve 135 and is forced back by this surface. The link 136 then causes the end 133b of the clamping spring 133 to yield rearwardly and unwinds the spring, so that the clamping spring 133 is unwound. This causes a rapid and considerable decrease in the initial stress in the clamping spring 133, so that this stress is no longer sufficient to secure the bush 110 to the nut 108. Friction causes the nut 108 to rotate with the threaded spindle 105a and to remain axially stationary on this spindle; the mechanism is thus in the idling position. If the mechanism is then driven in the opposite direction of rotation, the manner of operation is basically the same but in reverse; the projection 136b of the link first contacts the inclined edge surface 137b' of the sleeve 135.

FIGURE 10 shows a transmission mechanism, provided with a release device, for converting a rotary movement of a driving means into an axial displacement of a driven member, of which the general construction corresponds to that of the embodiments previously described; in this case also, a sleeve 235 having a longitudinal slot 235a is rigid with a tube similar to the tube 14 shown in FIGURES 1 and 2. One of the edges of the sleeve 235 bounding the longitudinal slot 235a has at the input end a shorter part 237a inclined to the direction of the axis and also has a longer part 237a' extending parallel to the direction of the axis; whereas the other of these edges of the sleeve 235 has at the input end a longer part 237b extending parallel to the direction of the axis and also has a shorter part 237b' inclined to the direction of the axis, in such a manner that the longitudinal slot 235 widens towards one side at one end of the sleeve 235 and towards the other side at the other end of the sleeve. The sleeve 235 surrounds a nut screwed on to a threaded spindle, and a bush on the nut; these parts are not shown in the drawing but are similar to the nut 108 and bush 110 on threaded spindle 105a in FIGURES 6 and 7. An initially stressed clamping spring 233 is arranged on the bush on the nut. The ends 233a and 233b of this clamping spring 233 are bent away radially outwards and each have a respective prolongation 233a' and 233b' extending in an axial direction towards the longitudinal centre of the clamping spring 233. These prolongations 233a' and 233b' may be welded on to the respective ends 233a and 233b of the clamping spring 233 or may be formed from this spring itself. A link 236 is disposed between the prolongations 233a' and 233b'. The free ends of the prolongations 233a' and 233b' bear respectively against shoulders 236c and 236d each provided on a respective one of the longitudinal edges of the link 236, and thus secure the link 236 against displacement in a longitudinal direction. The link 236 has at one end a laterally extending projection 236a and at the other end a projection 236b extending towards the other side; these projections 236a and 236b cooperate respectively with the longitudinal edges 237a, 237a' and 237b, 237b' of the sleeve 235.

If the threaded spindle not shown in FIGURE 10 is driven in the direction of rotation indicated by the arrow D in FIGURE 10, then friction at first causes the nut mounted on this threaded spindle to participate in the rotation of this spindle and to rotate the helical spring 233 and the link 236. After a small rotary movement the projection 236a of the link 236 impinges against the part 237a' of one longitudinal edge of the stationary sleeve 235 and is held back by this part, and a force $P_1$ is thus exerted on the link 236; this force rotates the link about its centre M. This rotation of the link 236 causes forces $P_2$ and $P_3$ to be exerted on the free ends of the prolongation 233a' and 233b' of the clamping spring 233; in accordance with the respective lever arm ratios $P_1M:P_2M$ and $P_1M:P_3M$ these forces are each considerably greater than the force $P_1$. These forces drive the prolongation 233a' and 233b' and therefore the ends 233a and 233b away from one another so as to tighten the clamping spring 233, so that the initial stress in the clamping spring 233 is increased to such an extent that the nut is held fast by the clamping spring and can no longer participate in the rotation of the threaded spindle. As a result, the nut is screwed further along the threaded spindle in the direction of the arrow E and thus drives a tube similar to the tube 14 shown in FIGURE 1, and all parts arranged in and on this tube, and also the member to be axially displaced, which member is connected to a coupling rod similar to the rod 22 shown in FIGURE 1. If the mechanism continues to be driven and the threaded spindle continues to rotate in the same direction after an end position has been reached or an obstacle has intervened so that further displacement of the aforesaid member is prevented, then the nut is displaced in the tube, as in FIGURE 1 where the compression spring 16 in the tube 1 is compressed. The projection 236a on the link 236 then finally reaches the descending part 237a of the longitudinal edge of the sleeve 235 secured in the tube, and slides down this edge. The nut, the clamping spring 233 and the link 236 then participate in the rotation of the threaded spindle until the prolongation 233b' of the clamping spring 233 contacts the part 237a' of the sleeve 235 and thereby prevents further participation of these members in this rotation. The force $P_1$ acting on the projection 236a of the link 236 is thereby eliminated and the link can rotate backwards about its centre M. The clamping action of the clamping spring 233 is thus reduced to such an extent that the spring can no longer hold the nut fast. The nut then participates again in the rotary movement of the threaded spindle and remains axially motionless on the spindle. The mechanism is thus in the idling position. If the mechanism is then driven in the opposite direction of rotation, then essentially the same process is repeated but in reverse; the projection 236b on the link 236 first comes into contact with the part 237b of the other longitudinal edge of the sleeve 235.

An oil film is formed between the bush 10 or 110 and the spires of the clamping spring 33, 133 or 233. This oil film is very advantageous when the mechanism is running idle, because the film then reduces the friction. On the other hand, however, this film has the disadvantage of delaying the transmission of power between the clamping spring 33, 133 or 233 and the bush 10 or 110, because the film has to be squeezed off before reliable transmission of power can take place. This state of affairs may be found very undesirable and disadvantageous in the case of mechanisms used in automatic installations, where the actuation of the member to be displaced has to begin very rapidly. It has now been found that this disadvantage can be very largely removed by enabling the oil in the oil film to escape more easily. This can be achieved by division of the surface against which the clamping spring 33, 133 or 233 bears, and also of the contacting surface of the clamping spring itself in certain cases; for this purpose this surface or surfaces are provided with shallow grooves. The oil film then extends over a plurality of small surfaces, so that the oil can easily escape into the grooves bounding these surfaces, instead of extending over a single relatively large surface so that the oil could only gradually escape from the central portion of this surface. A very simple and advantageous shape which these grooves may take is that of two intersecting helices with a large lead, as shown in FIGURE 11 diagrammatically illustrating a bush provided with these grooves.

I claim:

1. A transmission mechanism comprising a rotatably mounted spindle having an external screw-threaded, clamp means consisting firstly of a nut structure having an internal screw-thread engaging the screw-thread on the spindle and secondly of an axially displaceable tube structure surrounding the nut structure and the spindle and secured against rotation, a driven member connected to the tube structure, a longitudinal slot in said clamp means, said slot widening towards each of its ends, a clamping spring surrounding said nut and having radially bent ends, a link accommodated in said slot and engaging said radially bent ends of said clamping spring, and compression springs interposed between the nut structure and the ends of said tube structure.

2. A transmission mechanism as claimed in claim 1, in which said radially bent ends extend inwards and the slot is formed in the nut structure.

3. A transmission mechanism as claimed in claim 1, in which said radially bent ends extend outwards and the slot is formed in the tube structure.

4. A mechanism as claimed in claim 3, in which the tube structure comprises a tube and a sleeve surrounded by the tube and secured to the tube, the longitudinal slot being formed in the sleeve, and the link is in the form of a plate having at the ends of its longitudinal edges two projections which are diagonally opposite to one another.

5. A mechanism as claimed in claim 4, in which the ends of the clamping spring are held in the link inwardly of the projections, and the longitudinal slot is bounded by two longitudinal edges each made up of two parts oppositely inclined to the direction of the axis of the threaded spindle.

6. A mechanism as claimed in claim 5, in which the link has at each end two projections, and two of these projections diagonally opposite to one another are longer than the other two, each of said longer projections being located opposite a part of a longitudinal edge of the slot which has a greater inclination than the other part of the said edge.

7. A mechanism as claimed in claim 4, in which the link has only two projections, and each longitudinal edge of the slot comprises a part parallel to the axis of the spindle and a part inclined to said axis and adjacent one of said projections, the ends of the clamping spring being inserted into those corners of the link that are not provided with projections.

8. A mechanism as claimed in claim 3, in which the tube structure comprises a tube and a sleeve surrounded by the tube and secured to the tube, the longitudinal slot being formed in the sleeve, and in which two ball bearings one at each end of the nut structure and between the nut structure and the compression springs are arranged within the tube and are slidable relatively to the tube and the link has two projections diagonally opposite one another and extending laterally and two further projections diagonally opposite one another and arranged crosswise with respect to the first-mentioned projections and each contacting a respective one of said ball bearings, and each of the longitudinal edges of the slot comprises an inclined portion located adjacent to one of the laterally extending projections.

9. A mechanism as claimed in claim 3, in which the tube structure comprises a tube and a sleeve surrounded by the tube and secured to the tube, the longitudinal slot being formed in the sleeve, and in which the link has at its ends two laterally extending projections which are diagonally opposite one another, and has two longitudinal edges each provided with a shoulder, and in which each of the radially bent ends of the clamping spring has a prolongation directed in an axial direction towards the longitudinal centre of the clamping spring and contacting one of the shoulders on the link, and in which the longitudinal edges of the slot each have a shorter part inclined to the direction of the axis, the shorter parts being diagonally opposite one another and equally inclined and each located adjacent one of the laterally extending projections on the link, and a longer part which extends at least approximately parallel to the axis.

10. A mechanism as claimed in claim 1, in which a surface contacting the clamping spring is divided into small surfaces by shallow grooves.

11. A mechanism as claimed in claim 10, in which the grooves are in the form of two intersecting helices with a large lead.

12. A mechanism as claimed in claim 1, in which a surface of the clamping spring is divided into small surfaces by shallow grooves.

References Cited by the Examiner

UNITED STATES PATENTS 2,933,937 4/1960 Kron et al. _____ 74—424.8
2,936,625 5/1960 Heiseler _____ 74—424.8 X DON A. WAITE, *Primary Examiner.*